G. MOONEY.
Egg-Beater.
No. 216,053. Patented June 3, 1879.
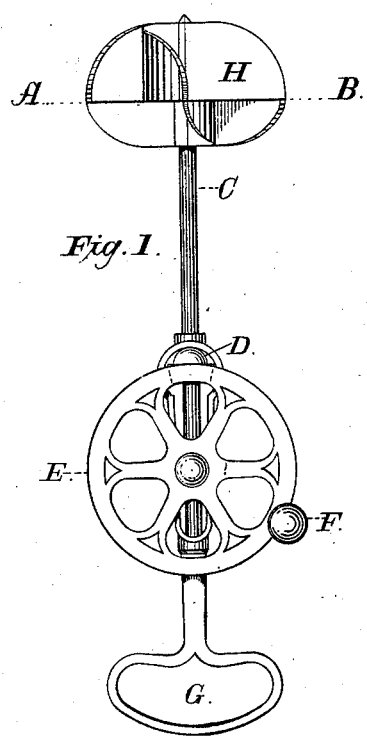
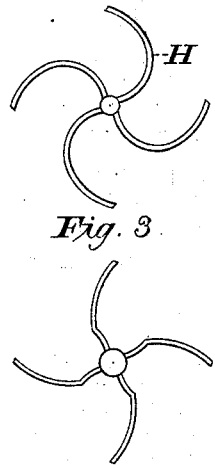
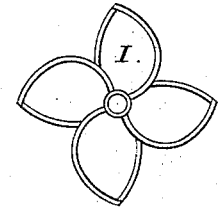
Witnesses
Joseph B. Hohnes
James B. Allen
Inventor
George Mooney

UNITED STATES PATENT OFFICE.

GEORGE MOONEY, OF PROVIDENCE, RHODE ISLAND.

IMPROVEMENT IN EGG-BEATERS.

Specification forming part of Letters Patent No. 216,053, dated June 3, 1879; application filed March 29, 1879.

*To all whom it may concern:*

Be it known that I, GEORGE MOONEY, of the city and county of Providence, and State of Rhode Island, have invented certain new and useful Improvements in Egg-Beaters; and I hereby declare that the following is a full, clear, and exact description of the same, reference being had to the accompanying drawings, forming part of this specification.

This invention has reference to improvements in the agitators or mixers of egg-beating; and the invention consists in the peculiar arrangement and form of the wings of the agitators or mixers, as will be more fully described hereinafter, and pointed out in the claims.

Figure 1 represents my improved egg-beater. Fig. 2 is a sectional view through line A B of beater, showing lower part of the same. Fig. 3 is a sectional view through line A B of an opposite curve, showing the top part of beater. Fig. 4 represents Figs. 2 and 3 cast together, the same as Fig. 1.

In the drawings, C is a shaft, secured in the bearings, and provided with a bevel-pinion, D, by which the shaft is rotated through the gear E by the handle F, the whole being firmly held by the handle-top G, thus forming the old and well-known handle of various kinds of egg-beaters.

H H are hook-shaped cutters or gatherers, secured to a shaft, that gather the egg or fluid to the center, forcing it through the openings I, where the fluid comes in contact with the reverse part of the beater, Fig. 3, and the curve being opposite to Fig. 2, and being a rotary motion, forces the fluid to the surface again, therefore forming a complete circulation over and over.

Flanges Fig. 2 are in opposite curve to flanges Fig. 3. The egg or fluid drawn into the center passing through aperture I, flanges, Fig. 2, being in an opposite curve to flanges, Fig. 3, force the egg or fluid to the surface again. With this construction it gives a complete circulation over and over to the egg.

Having thus described my invention, I claim as new and desire to secure by Letters Patent—

1. Two or more agitators cast in one piece and in opposite curves to each other.
2. The combination of the agitators with the frame and operating mechanism, as described.

GEORGE MOONEY.

Witnesses:
 JOSEPH B. HOLMES,
 JAMES B. ALLEN.